Jan. 2, 1968  E. NEVAL  3,361,953
DEVICE FOR THE CONTROL AND REGULATION OF THE NORMAL OPERATING
VOLTAGE OF AN ASYNCHRONOUS ALTERNATOR
Filed July 2, 1964

INVENTOR
EDOUARD NEVAL
BY *Hobbs & Easton*

ATTORNEYS

United States Patent Office 3,361,953
Patented Jan. 2, 1968

3,361,953
DEVICE FOR THE CONTROL AND REGULATION OF THE NORMAL OPERATING VOLTAGE OF AN ASYNCHRONOUS ALTERNATOR
Edouard Neval, Saint-Cloud, France, assignor to Bronzavia S.A., Courbevoie, France a French company
Filed July 2, 1964, Ser. No. 379,930
Claims priority, application France, Apr. 9, 1964, 970,336, Patent 1,399,717
5 Claims. (Cl. 322—95)

ABSTRACT OF THE DISCLOSURE

In an asynchronous alternator comprising a stator and armature core, a rotor which is designed to rotate within said armature core, windings around said armature core and excitation capacitors connected to said windings, the provision of a device for controlling the nominal voltage of said asynchronous alternator and comprising an auxiliary winding on said armature core, a direct-current source connected to said auxiliary winding and current adjusting means interconnected between said auxiliary winding and said current source.

---

It is known that the alternating-current generators which are referred-to as asynchronous alternators are none other than asynchronous motors with squirrel-cage rotors which are caused to rotate at a speed higher than the speed of synchronism, the magnetizing excitation current being usually obtained by means of capacitors which are connected to the terminals of the machine.

As in any electric current generator, the voltage of an asynchronous alternator varies, on the one hand, as a function of the load and, on the other hand, as a function of the driving speed.

For an optimum value of magnetization of the magnetic circuit and for operation at a frequency which is maintained constant (which corresponds in practice to a speed variation of approximately 1%), the voltage drop between no-load operation and full-load operation is of the order of five percent.

On the other hand, when the driving speed of the alternator rotor is maintained strictly constant, the voltage drop between no-load operation and full-load operation reaches approximately six percent, for a variation of only one percent in the frequency.

It is seldom possible in practice to maintain the driving speed of the alternator rotor at a constant value since this speed decreases to a greater or lesser extent according to the load and the type of driving motor, thereby giving rise to an additional voltage drop, the value of which is added to those mentioned above.

The object of the present invention is to permit of control and regulation of the voltage supplied by an asynchronous alternator which is excited by means of a bank of capacitors, and by this means either to control the value of the normal operating voltage of the machine according to a predetermined programme or to maintain constant the said normal operating voltage of the machine, in spite of variations in the output of the alternator and variations in the driving speed which are in practice relatively low (of the order of two percent approximately).

In accordance with the invention, the control or regulation of the normal operating voltage of an asynchronous alternator are made possible by modifying the impedance of the stator of the alternator under the action of an adjustable auxiliary direct-current flux produced within the stator armature. The said flux can be produced under the action of an auxiliary winding supplied with direct current which is controlled in dependence on variations in the nominal voltage of the alternator.

The auxiliary winding referred-to is uniformly distributed over the iron stator core or armature core around which it is wound in the form of a toroidal coil. The internal portions of said winding are fitted in the bottom of the stator slots.

In order that the external portions of the auxiliary winding should not project from the surface of the iron stator core, this latter is provided, on the external surface thereof, with slots in which the portions referred-to are guided and housed.

In view of the nature of the auxiliary winding, the direct-current power which is necessary for the purpose of obtaining the above-mentioned auxiliary flux is low (of the order of a few percent of the power of the alternator); in accordance with the invention, this power can be supplied by rectifying a current which is taken from the current delivered by the asynchronous alternator.

In the event that the normal operating voltage of the alternator were too high and were to entail the use of a voltage-reducing transformer, the excitation current of the auxiliary winding can be supplied by rectifying a current which is taken from the current which passes through only a part of the stator winding.

Other particular features and characteristics of the invention will be brought out by the description which follows below, reference being made to one example of practical application of the invention, said example being given solely by way of non-limitative example and illustrated diagrammatically in the accompanying drawings, wherein:

FIG. 3 is a view in perspective showing a portion of the auxiliary winding which is wound around the stator armature core;

FIG. 4 is a front view of a portion of a lamination of the stator armature core.

Figure 1:
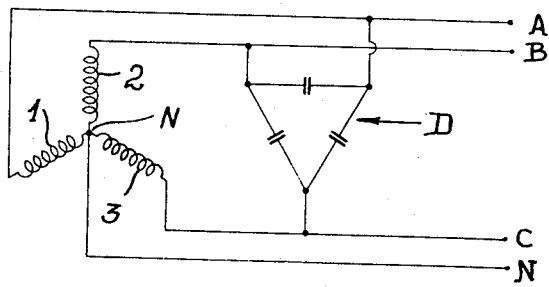
FIG. 1 is a diagram of an asynchronous alternator of known type.
Figure 2:
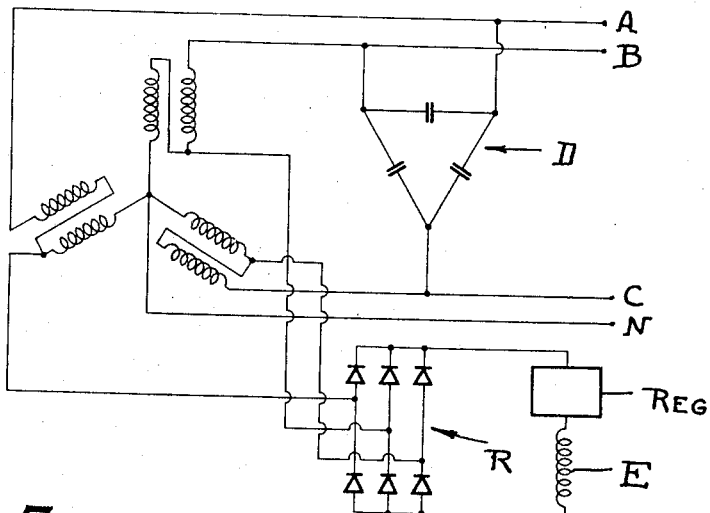
FIG. 2 is a diagram of an asynchronous alternator of improved design in accordance with the invention.
Figure 2:
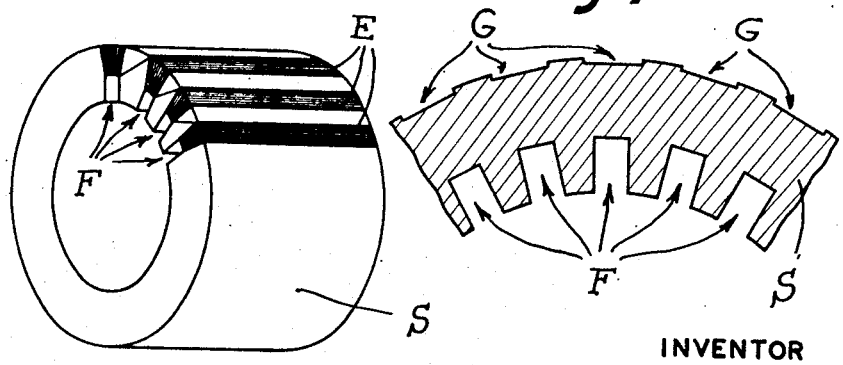

In an asynchronous alternator of conventional type as shown in FIG. 1, the stator windings 1, 2 and 3 lead respectively to the terminals A, B, C, on one hand, and to the neutral N, on the other.

The excitation of the machine is effected by means of the bank of capacitors D.

In accordance with the invention, the normal operating voltage of the alternator is controlled and regulated by causing the impedance of the stator S to vary by means of a variable auxiliary direct-current flux which is generated by means of an auxiliary winding E which is wound in a toroidal coil around the stator core S or armature core, said auxiliary winding being supplied with direct current obtained by rectifying through rectifiers R a part of the current delivered by the alternator.

The rectified current which is supplied to the auxiliary winding E is controlled by regulating means REG which are disposed externally of the machine and which are independent of the assembly as described above.

When the regulator REG, which does not form a part of the invention, is provided for the purpose of maintaining constant the normal operating voltage of the alternator, it is designed to supply the maximum current to the auxiliary winding E, when the alternator is running on no load, and to cause said excitation current to decrease to zero progressively, as the output of the alternator increases.

As can be seen from FIG. 3, the auxiliary winding E is a toroidal coil in which the internal portion of each turn is housed in the bottom of one of the slots F of the stator core S. In addition, in order to prevent the outer portions of these turns from projecting from the external surface of the iron core, the stator laminations are provided externally with recesses G for the purpose of guiding and housing the external portions referred-to (as shown in FIG. 4).

In this manner, the complete stator assembly can readily be covered with a protective sheath of non-magnetic material in accordance with customary practice.

Tests performed have shown that the regulating system in accordance with the invention does not produce any alternating-current wave distortion.

It will be apparent that the example of practical application of the invention as described hereinabove and as illustrated in the accompanying drawings has been given solely by way of non-limitative example and that any and all detail modifications can be made therein.

What I claim is:

1. In an asynchronous alternator comprising a stator and armature core, a rotor which is designed to rotate within said armature core, windings around said armature core and excitation capacitors connected to said windings, the provision of a device for controlling the nominal voltage of said asynchronous alternator and comprising an auxiliary winding on said armature core, a direct-current source connected to said auxiliary winding and current adjusting means interconnected between said auxiliary winding and said current source.

2. Device for controlling the nominal voltage of an asynchronous alternator as defined in claim 1, wherein the direct-current source is constituted by rectifying means which are connected to the windings of the alternator.

3. Device for controlling the nominal voltage of an asynchronous alternator as defined in claim 1, wherein the auxiliary winding is adapted to form a toroidal coil around the stator armature core.

4. Device for controlling the nominal voltage of an asynchronous alternator as defined in claim 3, wherein, on the one hand, the stator armature core is provided with internal slots for the windings and, on the other hand, those portions of the toroidal auxiliary winding which are located internally of said armature core are housed within the same internal slots as the windings.

5. Device for controlling the nominal voltage of an asynchronous alternator as defined in claim 4, wherein the stator armature core is provided with external slots which are substantially parallel to the axis of the alternator and in which are fitted the external portions of the toroidal auxiliary winding.

References Cited

UNITED STATES PATENTS

| | | | |
|---|---|---|---|
| 2,689,327 | 9/1954 | Haas | 322—95 X |
| 2,889,475 | 6/1959 | Emerson | 310—171 |
| 3,157,810 | 11/1964 | Adkins | 310—180 X |
| 3,219,859 | 11/1965 | Terry et al. | 310—168 X |

MILTON O. HIRSHFIELD, *Primary Examiner.*

J. D. TRAMMELL, *Assistant Examiner.*